Feb. 17, 1931.  A. MOORHOUSE  1,793,186
INTERNAL COMBUSTION ENGINE
Filed Dec. 2, 1926
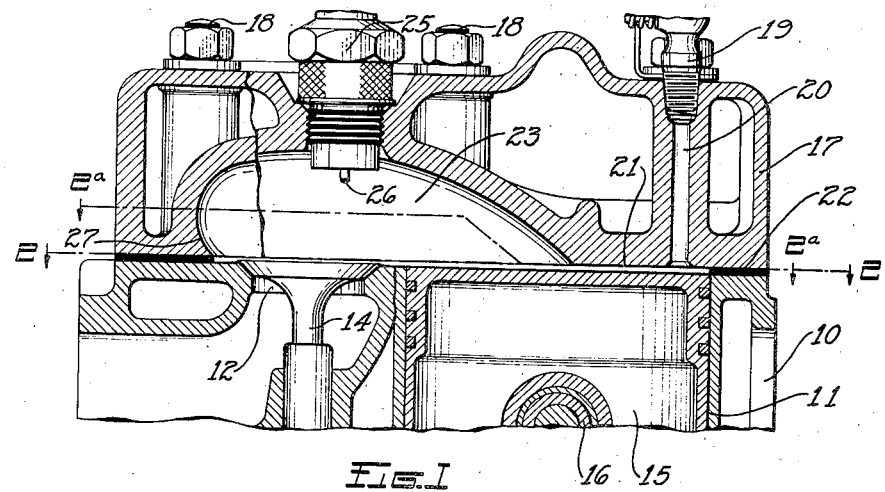
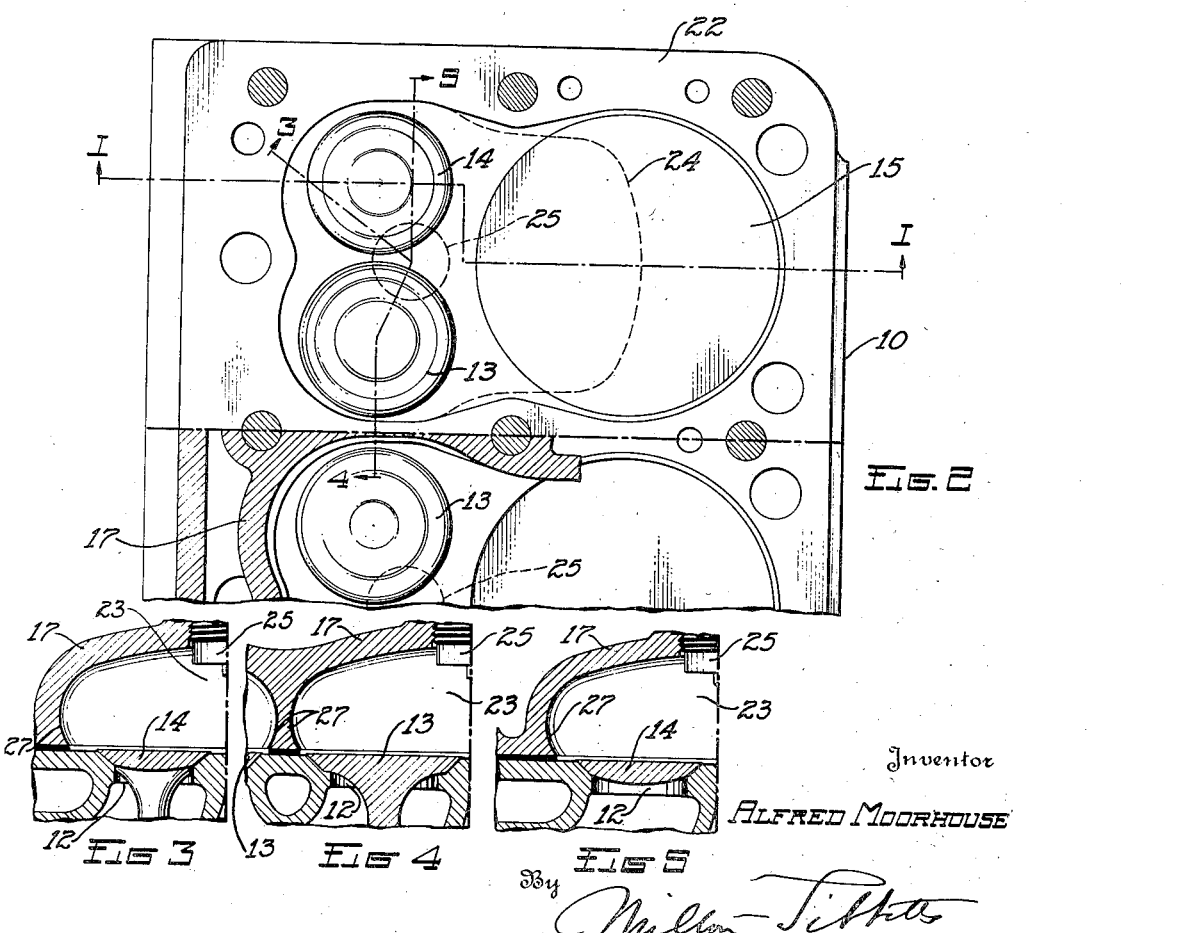
Inventor
ALFRED MOORHOUSE
By Miller Tibbitts
Attorney Patented Feb. 17, 1931

1,793,186

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

INTERNAL-COMBUSTION ENGINE

Application filed December 2, 1926. Serial No. 152,116.

This invention relates to internal combustion engines and particularly to L-head engines or those in which the inlet and exhaust valves are arranged at one side of the cylinder. It is an improvement upon the engine shown in Patent No. 1,474,003, Ricardo, dated November 13, 1923.

In Ricardo type engines the detachable cylinder head is brought down over that half of the cylinder farthest removed from the valves so that there is only a slight clearance between the piston and head, and the combustion chamber extends over the other half of the cylinder and over the valves. These engines produce considerable turbulence in the combustion chamber at the end of the compression stroke due to the shape of the combustion chamber and to the sudden expulsion into the combustion chamber of the entrapped mixture between the piston and low part of the cylinder head. The combustion chamber is less spread out than in other L-head engines and it lends itself particularly well to the objects of this invention.

One of the objects of the present invention is to provide a Ricardo type combustion chamber with an undercut space or lateral recess around the valves in order to increase the valve clearance and at the same time to give better proportions to the combustion chamber.

In small L-head motors the size of the valves usually determines the length of the cylinder block because a certain amount of gasket space must be left between the valves of adjacent cylinders. It is another object of the invention to give greater clearance around the valves without reducing the spacing of the combustion chambers at the gasket and without lengthening the cylinder block. This object is attained by providing the side wall of the combustion chamber with an undercut space or recess which embraces approximately half the circumference of each valve and extends into the partition wall that separates adjacent chambers.

When the Ricardo type combustion chamber is used and when the side walls thereof around the valves are undercut as suggested hereinabove, a more concentrated or compact form of combustion chamber is obtained. It may be said, therefore, that another object of the invention is to provide a compact combustion chamber of the Ricardo type whereby the mixture will be more concentrated around the spark plug points so that higher compression may be employed without causing detonation.

Other objects of the invention will appear from the following description taken in connection with the drawings, which form a part of this specification, and in which:

Fig. 1 is a vertical transverse section through a portion of an internal combustion engine embodying the invention, the section being taken substantially on the line 1—1 of Fig. 2;

Fig. 2 is a horizontal section, the portion thereof above the heavy dot-and-dash line being taken just above the gasket or on the line 2—2 of Fig. 1, and the portion below said dot-and-dash line being substantially on the line 2a—2a of Fig. 1, and Figs. 3, 4 and 5 are fragmentary sections on the lines 3, 4 and 5 respectively of Fig. 2.

Referring to the drawings, 10 represents the cylinder block of an L-head multi-cylinder internal combustion engine in which the cylinders 11 are arranged vertically, and the ports 12 of which are arranged adjacent to and at one side of the cylinders. Usually the inlet port is slightly larger than the exhaust port. Each of the ports has a valve and the inlet valves are indicated at 13 and the exhaust valves at 14, in these drawings. The tops of these valves are arranged substantially flush or in a plane with the top of the cylinder, when the valves are closed. In the drawing a piston is represented at 15 and its piston pin at 16. It is shown at the top of its stroke which may be the compression stroke, and in this position the top of the piston is preferably flush or in a plane with the top of the cylinder block and consequently it is substantially flush with the top of the valves.

The engine cylinder head is indicated at 17 and it is suitably detachably connected to the cylinder block as by bolts or studs 18. A priming cock 19 is threaded into the cylinder head in line with a drilled opening 20.

The cylinder head is shown as formed with a flat portion 21 which covers substantially that half of the cylinder farthest removed from the valves, this portion of the cylinder head being so positioned that there is only slight clearance between it and the piston when the latter is at the top of the compression stroke. As shown, this clearance is determined by a gasket 22 placed between the top of the cylinder and the cylinder head.

The cylinder head 17 has a recess over the remainder of the cylinder and over the valve ports forming a combustion chamber 23. The shape of this combustion chamber is well shown in the drawings, various vertical sections being illustrated in Figs. 1, 3, 4 and 5, and the dotted line 24 indicating its shape in a horizontal plane at the gasket.

Threaded into an opening in the cylinder head is a spark plug 25 which extends into the combustion chamber so that its ignition or sparking points 26 are approximately in or just above the center of the volume of the combustion chamber.

The wall of the combustion chamber 23 extends in a curve from the middle of the upper end of the cylinder to the spark plug, as shown particularly in Fig. 1, so that as the piston moves upwardly on its compression stroke the combustible mixture or gas in the cylinder moves in a path away from the cylinder and across the spark plug. Thus the bulk of the mixture is forced into the combustion chamber and there compressed.

This invention provides a very much concentrated combustion chamber with unusual clearance around the valves to facilitate ingress and egress of the gases, and this without unduly lengthening the cylinder block. Thus, the combustion chamber walls just above the outer circumference of the valves are undercut or recessed as shown best perhaps at 27 in Figs. 1, 3, 4 and 5. This undercutting is done at no sacrifice of gasket space between adjacent combustion chambers as will be observed particularly in Figs. 2 and 4. Approximately one-quarter inch gasket space is provided as a minimum between chambers and a one-eighth inch wall exists between the undercut parts 27. The curving or undercutting of the wall of the combustion chamber is shown in Figs. 3, 4 and 5 as well as in Fig. 1, and it will be seen that by reason of the undercutting and the curve of the wall around the valves the clearance is ample and the chamber is more concentrated about the spark plug than it otherwise would be.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a multi-cylinder internal combustion engine, the combination of a cylinder block, a detachable head therefor having combustion chambers separated by partitions, each of said combustion chambers being concentrated over the valves and approximately one-half of a cylinder, that part of each partition substantially in the zone of the valves having a transverse cross section of diminishing magnitude from the face of the head to a point corresponding substantially to one-half the depth of the combustion chamber.

2. In a multi-cylinder internal combustion engine, the combination of a cylinder block, a detachable head therefor having combustion chambers separated by partitions, each of said combustion chambers being concentrated over the valves and approximately one-half of a cylinder, that part of each partition substantially in the zone of the valves having a transverse cross section of diminishing magnitude from the face of the head to a point corresponding substantially to one-half the depth of the combustion chamber and of increasing magnitude from said point to substantially the full depth of the combustion chamber.

3. In a multi-cylinder combustion engine, the combination of the cylinder block, the cylinders arranged in line lengthwise of said block, the intake and exhaust valve ports and valves, the valves of each pair being arranged side by side and at one side of the corresponding cylinder, a detachable cylinder head having a series of combustion chambers, one for each cylinder and pair of valves, adjacent chambers being separated by a solid partition wall of sufficient thickness at its base to afford space for a gasket of proper width, each combustion chamber being concentrated over the valves and over approximately one-half of the corresponding cylinder, the side walls of each chamber adjacent to the valves having a recess extending around approximately half the circumference of each valve and into the partition wall separating one combustion chamber from the next, said lateral recess being of such shape that its lower part slopes toward the valves.

4. In an internal combustion engine, the combination with the cylinder and its piston and with the valve ports and valves arranged side by side at one side of the cylinder, of a detachable head having a combustion chamber concentrated over the valves and over approximately half of the cylinder and having a flat portion covering the rest of the area of the cylinder and so positioned that there is only slight clearance between the piston and said flat portion of the head when the piston is at the top of its stroke, the side wall of said chamber having a lateral recess adjacent to the valves extending around approximately half the circumference of each valve, the surface of said recess being sloped towards said valves, and a spark-plug in the head extending into said combustion chamber at a point above the approximate center of volume of said chamber.

In testimony whereof I affix my signature.

ALFRED MOORHOUSE.